United States Patent
Eguchi et al.

[11] Patent Number: 6,063,729
[45] Date of Patent: May 16, 2000

[54] THERMAL TRANSFER SHEET

[75] Inventors: Hiroshi Eguchi; Kazuya Yoshida, both of Tokyo-to, Japan

[73] Assignee: Dai Nippon Printing Co., Ltd., Japan

[21] Appl. No.: 09/089,425

[22] Filed: Jun. 3, 1998

Related U.S. Application Data

[63] Continuation of application No. 08/677,550, Jul. 18, 1996, Pat. No. 5,803,530.

[30]  Foreign Application Priority Data

Jul. 21, 1995 [JP] Japan ..................... 7-206828

[51] Int. Cl.⁷ .............. B41M 5/035; B41M 5/38
[52] U.S. Cl. .............. 503/227; 428/195; 428/913; 428/914
[58] Field of Search ................ 8/471; 428/195, 428/913, 914; 503/227

[56]  References Cited

FOREIGN PATENT DOCUMENTS

| | | | |
|---|---|---|---|
| 0 279 467 A2 | 8/1988 | European Pat. Off. | 503/227 |
| 0 423 796 A1 | 4/1991 | European Pat. Off. | 503/227 |
| 0 672 541 A1 | 9/1995 | European Pat. Off. | 503/227 |
| 0 743 194 A1 | 11/1996 | European Pat. Off. | 503/227 |

*Primary Examiner*—Bruce H. Hess
*Attorney, Agent, or Firm*—Parkhurst & Wendel, LLP

[57]  ABSTRACT

A thermal transfer sheet is provided which can provide a sharp image having a satisfactory density and excellent various types of fastness, particularly excellent light fastness.

The thermal transfer sheet comprises a substrate sheet and a dye layer provided on one surface of the substrate sheet. The dye layer is formed of a dye and a binder, the dye is represented by the following general formula (I):

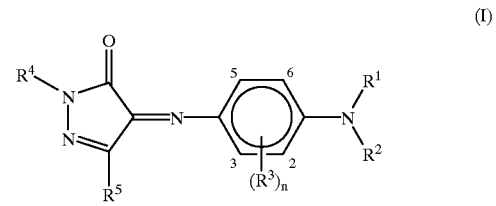

3 Claims, 1 Drawing Sheet

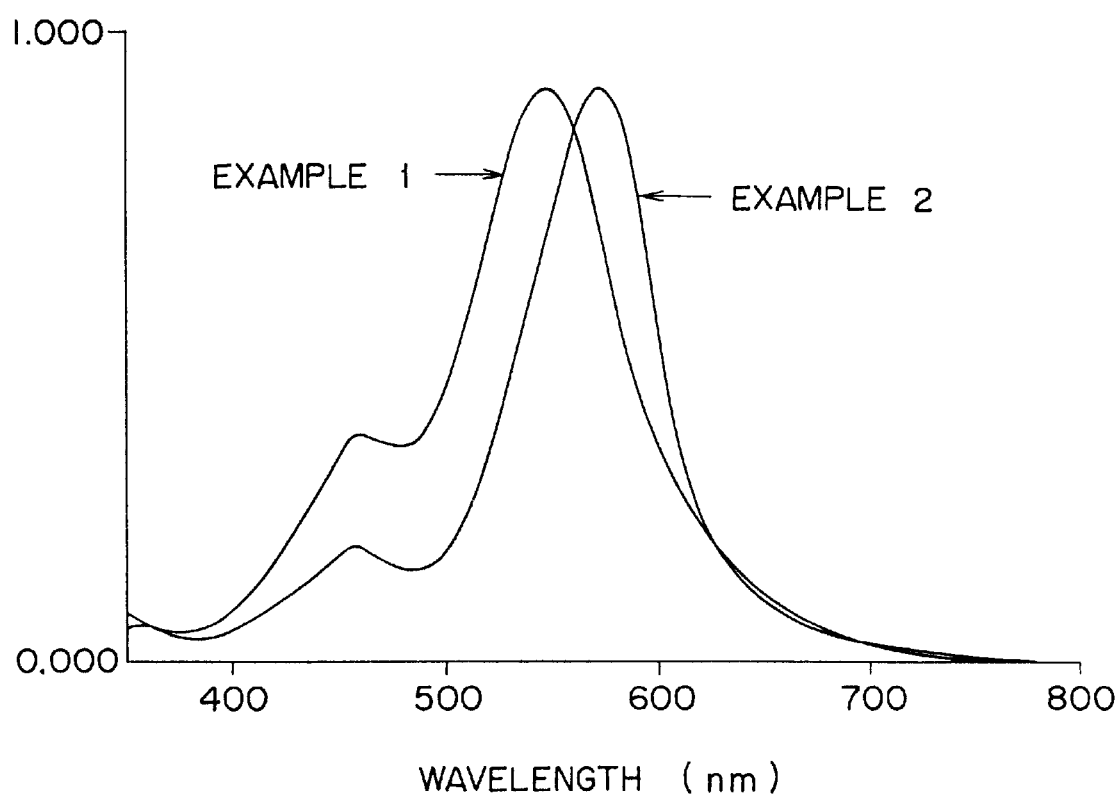
F I G. 1

THERMAL TRANSFER SHEET

This is a Continuation of application Ser. No. 08/677,550 filed Jul. 18, 1996 now U.S. Pat. No. 5,803,530.

TECHNICAL FILED

The present invention relates to a thermal transfer sheet and more particularly to a thermal transfer sheet which, in a thermal transfer process using a sublimable dye, can provide an image having a satisfactory density and possessing excellent various types of fastness, particularly excellent light fastness.

BACKGROUND OF INVENTION

Various sublimation type thermal transfer processes are known in the art, and, in recent years, the advance of recording methods has enabled fine letters, figures, full-color, photograph-like images or the like to be formed on a thermal transfer image-receiving sheet, for example, a polyester sheet or paper bearing a dye-receptive layer, at a high speed by means of a thermal head or the like.

In the above prior art, the heating time at the time of thermal transfer by means of a thermal head should be very short. In this case, the sublimable dye and the object, on which the dye is to be transferred, are not satisfactorily heated, making it impossible to form an image having a satisfactory density. In order to cope with such high-speed recording, dyes having excellent sublimability have been developed. In general, however, the molecular weight of such dyes is so low that the light fastness of the transferred dyes in the object is unsatisfactory, resulting in fading of the formed image with the elapse of time.

When dyes having a relatively large molecular weight are used in order to avoid the above problem, the sublimation rate of such dyes is so low that images having satisfactory density cannot be formed in high-speed recording.

Pyrazolone-azomethine dyes having excellent color density are known as dyes for thermal transfer sheets (for example, Japanese Patent Laid-Open Nos. 156791/1984, 184339/1984, 19138/1985, 205288/1988, and 147893/1991). Images formed using these pyrazolone-azomethine dyes by thermal transfer unfavorably have remarkably poor light fastness.

SUMMARY OF INVENTION

Accordingly, an object of the present invention is to provide a thermal transfer sheet which, in a thermal transfer process using a sublimable dye, can provide an image having a satisfactory density and possessing excellent various types of fastness, particularly excellent light fastness.

The above object of the present invention can be attained by a thermal transfer sheet comprising:

a substrate sheet; and a dye layer provided on one surface of the substrate sheet, the dye layer being formed of a dye and a binder, the dye contained in the dye layer being at least one member selected from dyes represented by the following general formulae (I) and (II):

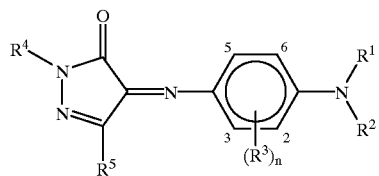

(I)

wherein $R^1$ and $R^2$ each independently represent a substituted or unsubstituted alkyl, cycloalkyl, aralkyl, or aryl group; $R^3$ represents a hydrogen atom, a halogen, a cyano group, a hydroxyl group, a substituted or unsubstituted alkyl, alkoxy, cycloalkyl, aralkyl, aryl, acyl, acylamino, or alkylsulfonylamino group; $R^4$ represents a substituted or unsubstituted alkyl, cycloalkyl, or aralkyl group; $R^5$ represents a substituted or unsubstituted aminocarbonyl, alkoxycarbonyl, or aryloxycarbonyl group; and n is an integer of 1 or 2; and

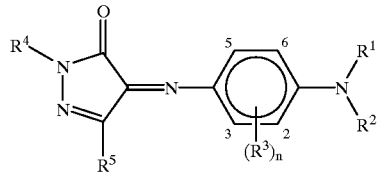

(II)

wherein $R^1$, $R^2$, $R^3$, and n are as defined above in connection with the formula (I), $R^4$ represents a substituted or unsubstituted alkyl, cycloalkyl, aralkyl, or aryl group, and $R^5$ represents a cyano group.

According to the present invention, the thermal transfer sheets using the dye represented by the general formula (I) or (II) can provide images having higher density and superior various types of fastness, particularly excellent light fastness, as compared with the thermal transfer sheets using other conventional pyrazolone-azomethine dyes. Further, the dyes represented by the formulae (I) and (II) have a broad absorption spectrum and, hence, can be mixed with other dyes to provide a thermal transfer sheet for black.

BRIEF DESCRIPTION OF THE DRAWINGS

FIG. 1 is a diagram showing absorption spectra for respective dyes used in Examples 1 and 2.

The present invention will be described in more detail with reference to the following preferred embodiments.

BEST MODE FOR CARRYING OUT THE INVENTION

The thermal transfer sheet of the present invention is characterized by using at least one member selected from dyes represented by the general formulae (I) and (II), and the construction of the thermal transfer sheet according to the present invention may be the same as that of the conventional thermal transfer sheets except for the above feature. The dyes represented by the general formulae (I) and (II) may be synthesized by any conventional process.

In the present invention, the dyes presented by the general formulae (I) and (II) may be used alone or as a mixture of two or more. Further, they may be used in combination with other dye(s) from the viewpoint of regulating tone. Further, the dyes represented by the general formula (I) and/or (II)

may be mixed with other dye(s) to prepare a thermal transfer sheets for black.

The feature of the dyes represented by the general formulae (I) and (II) used in the present invention resides in a combination of the substituents $R^1$ to $R^5$. Particularly excellent light fastness can be provided when the combination of the substituents is such that $R^1$ and $R^2$ are an ethyl group, $R^3$ and $R^4$ are a methyl group and $R^5$ is an electron-withdrawing group such as a substituted carbonyl group or a cyano group.

According to a preferred embodiment of the present invention, $R^1$ and $R^2$ in the formulae (I) and (II) are selected from a substituted or unsubstituted $C_1$–$C_8$, preferably $C_1$–$C_4$, alkyl group, a substituted or unsubstituted $C_3$–$C_8$, preferably $C_5$–$C_7$, cycloalkyl group, a substituted or unsubstituted $C_6$–$C_{13}$, preferably $C_6$–$C_{11}$, aralkyl, and a substituted or unsubstituted $C_5$–$C_{13}$, preferably $C_5$–$C_{10}$, aryl group;

the hydrocarbon residue represented by $R^3$ is selected from a substituted or unsubstituted $C_1$–$C_8$, preferably $C_1$–$C_4$, alkyl, a substituted or unsubstituted $C_1$–$C_8$, preferably $C_1$–$C_4$, alkoxy, a substituted or unsubstituted $C_3$–$C_8$, preferably $C_5$–$C_7$, cycloalkyl, a substituted or unsubstituted $C_6$–$C_{13}$, preferably $C_6$–$C_{11}$, aralkyl, a substituted or unsubstituted $C_5$–$C_{13}$, preferably $C_5$–$C_{10}$, aryl, a substituted or unsubstituted $C_1$–$C_8$, preferably $C_1$–$C_4$, acyl, a substituted or unsubstituted $C_1$–$C_8$, preferably $C_1$–$C_4$, acylamino, and a substituted or unsubstituted $C_1$–$C_8$, preferably $C_1$–$C_4$, alkylsulfonylamino;

the hydrocarbon residue represented by $R^4$ is selected from a substituted or unsubstituted $C_1$–$C_8$, preferably $C_1$–$C_6$, alkyl, a substituted or unsubstituted $C_3$–$C_8$, preferably $C_5$–$C_7$, cycloalkyl, a substituted or unsubstituted $C_6$–$C_{13}$, preferably $C_6$–$C_{11}$, aralkyl, and a substituted or unsubstituted $C_5$–$C_{13}$, preferably $C_5$–$C_{10}$, aryl group; and the hydrocarbon residue represented by $R^5$ is selected from a substituted or unsubstituted $C_1$–$C_8$, preferably $C_1$–$C_6$, aminocarbonyl, a substituted or unsubstituted $C_1$–$C_8$, preferably $C_1$–$C_6$, alkoxycarbonyl, and a substituted or unsubstituted $C_5$–$C_{13}$, preferably $C_5$–$C_{10}$, aryloxycarbonyl group.

The substrate sheet usable in the thermal transfer sheet of the present invention may be any conventional sheet so far as it has heat resistance and strength on a certain level. Examples thereof include 0.5 to 50 μm-thick, preferably 3 to 10 μm-thick, papers, various processed papers, polyester films, polystyrene films, polypropylene films, polysulfone films, polycarbonate films, aramid films, polyvinyl alcohol films, and cellophane. Among them, polyester films are particularly preferred.

The dye layer provided on the surface of the substrate sheet is a layer formed of a dye held by any suitable binder resin.

The binder resin for holding the dye may be any conventional resin commonly used for this purpose. Preferred examples thereof include cellulosic resins, such as ethyl cellulose, hydroxyethyl cellulose, ethylhydroxy cellulose, hydroxypropyl cellulose, ethylhydroxyethyl cellulose, methyl cellulose, cellulose acetate, cellulose acetate butyrate, cellulose acetate propionate, and cellulose nitrate; vinyl resins, such as polyvinyl alcohol, polyvinyl acetate, polyvinyl butyral, polyvinyl acetoacetal, polyvinyl pyrrolidone, polystyrene, and be used alone or in the form of a mixture or a copolymer. Further, various curing agents may be added thereto. Among others, a polyvinyl butyral and a polyvinyl acetoacetal are particularly preferred from the viewponts of heat resistance, transferability of dyes and the like.

In the present invention, the following releasable graft copolymer may be used as a release agent or a binder resin instead of the above binder resin. The releasable graft copolymer is such that at least one releasable segment selected from a polysiloxane segment, a flulorocarbon segment, a fluorohydrocarbon segment, and a long-chain alkyl segment is graft-polymerized onto a polymer backbone.

Among them, a graft copolymer prepared by grafting a polysiloxane segment onto a backbone of a polyvinyl acetal resin is particularly preferred.

The above graft copolymer may be prepared, for example, by reacting a polysiloxane having a functional group with a diisocyanate to prepare a silicone chain for grafting and grafting the silicone chain, for grafting, onto polyvinyl acetal. More specifically, for example, hexamethylene diisocyanate is reacted with a dimethylpolysiloxane having a hydroxyl group on its one terminal in a solvent of a 1:1 mixture of methyl ethyl ketone and methyl isobutyl ketone in the presence of 0.01 to 1.0% by weight of a tin catalyst (for example, dibutyltin) at a temperature of about 50 to 100° C. to prepare a silicone chain for grafting.

The silicone chain for grafting is then reacted with a polyvinyl acetal resin in a solvent of a 1:1 mixture of methyl ethyl ketone and methyl isobutyl ketone to prepare a silicone-grafted polyvinyl acetal resin.

When the above graft copolymer is used as a release agent (which functions to improve the releasability of the thermal transfer sheet from an image-receiving paper at the time of thermal transfer) for the dye layer, the content of the releasable segment in the release agent is preferably such that the content of the releasable segment in the graft copolymer is 10 to 80% by weight. When the content of the releasable segment is excessively low, the releasability of the thermal transfer sheet is unsatisfactory. On the other hand, when it is excessively high, the compatibility with the binder resin is lowered, unfavorably posing a problem associated with the transferability of dyes or other problems. When the above release agents are added to the dye layer, they may be used alone or as a mixture of two or more in an amount 1 to 40 parts by weight based on 100 parts by weight of the binder resin.

When the amount of the release agent added is excessively small, the releasing effect is unsatisfactory, while when it is excessively large, the transferability of the dye in the dye layer and the strength of the dye layer are deteriorated and, at the same time, discoloration of the dye in the dye layer and a problem of storage stability of the thermal transfer sheet are likely to occur.

On the other hand, when the graft copolymer is used as a binder resin for the dye layer, the content of the releasable segment in the binder resin is preferably such that the content of the releasable segment in the binder resin is 0.5 to 40% by weight. When the amount of the release agent added is excessively small, the releasability of the dye layer is unsatisfactory, while when it is excessively large, the transferability of the dye in the dye layer and the strength of the dye layer are deteriorated and, at the same time, discoloration of the dye in the dye layer and a problem of storage stability of the thermal transfer sheet are likely to occur.

The dye layer in the thermal transfer sheet of the present invention basically comprises the above materials. Further, if necessary, it may further comprises various additives commonly used in the conventional thermal transfer sheets. Preferably, the dye layer may be formed by dissolving or dispersing the above dye, binder resin, and other optional components, for example, organic or inorganic fine particles, such as polyethylene wax, for improving the releasability or the coatability of an ink, in a suitable solvent to prepare a coating liquid or an ink for a dye layer, coating the coating liquid or ink onto a substrate sheet, and drying the coating.

The thickness of the dye layer formed in this way is suitably 0.2 to 5.0 μm, preferably about 0.4 to 2.0 μm, and the content of the dye in the dye layer is suitably 5 to 70% by weight, preferably 10 to 60% by weight, based on the weight of the dye layer.

The above thermal transfer sheet according to the present invention as such can be advantageously used for thermal transfer. It may further comprises an anti-tack layer, that is, a release layer. The provision of such a layer prevents sticking of the thermal transfer sheet to the thermal transfer image-receiving sheet at the time of thermal transfer and enables the thermal transfer to be performed at a higher temperature to form an image having a higher density.

Regarding this release layer, mere adherence of an anti-tack inorganic powder can offer considerable effect. Further, a 0.01 to 5 μm-thick, preferably 0.05 to 2 μm-thick, release layer may be formed from a resin having excellent releasability, for example, a silicone, acrylic, or fluorinated polymer.

In this connection, it should be noted that the incorporation of the inorganic powder or releasable polymer into the dye layer suffices for attaining satisfactory release effect. Further, in order to prevent adverse effect of heat derived from the thermal head, a heat-resistant layer may be provided on the back surface of the thermal transfer sheet, if necessary, through a primer layer.

A thermal transfer image-receiving sheet, for forming an image, which is used in combination with the above thermal transfer sheet may be any sheet so far as the recording surface thereof is receptive to the above dye. When the sheet is paper, a metal, glass, a synthetic resin or the like which is not receptive to the dye, a dye-receptive layer may be formed on at least one surface thereof.

The thermal transfer image-receiving sheet used in combination with the thermal transfer sheet of the present invention is particularly preferably a polyester sheet or film or a sheet provided with a polyester layer. A sheet or a film of a vinyl chloride/vinyl acetate copolymer is also preferred. In this connection, it should be noted that, even when the sheet to be used as a thermal transfer image-receiving sheet is paper, a metal, glass or the like which is not dyeable, such a sheet may be used as the thermal transfer image-receiving sheet by coating a solution or a dispersion of a dyeable resin as described above onto the recording surface of the sheet and drying the coating, or alternatively laminating a film of the dyeable resin on the sheet.

In the thermal transfer using the thermal transfer sheet of the present invention and the thermal transfer image-receiving sheet, any conventional means for applying thermal energy may be used. For example, a contemplated purpose can be sufficiently attained by applying a thermal energy of about 5 to 100 mJ/mm$^2$ through the control of a recording time by means of a recording device, such as a thermal printer (for example, a video printer VY-100 manufactured by Hitachi, Limited).

The present invention will be described in more details with reference to the following examples and comparative examples. In the examples and comparative examples, "parts" and "%" are by weight unless otherwise specified.

EXAMPLES 1 to 21

An ink composition for a dye layer was prepared according to the following formulation and coated at a coverage of 1.0 g/m$^2$ on a dry basis onto a 6 μm-thick polyethylene terephthalate film, the back surface of which had been subjected to treatment for imparting heat resistance, and the coating was dried to prepare a thermal transfer sheet of the present invention.

Dye listed in Table 1 3.0 parts
Polyvinyl acetoacetal resin 3.5 parts
Methyl ethyl ketone 46.5 parts
Toluene 46.5 parts In Table 1, the maximum absorption wavelength and the molar extinction coefficient were measured in the form of an ethyl acetate solution of each of the dyes listed in the table. Absorption spectra for respective dyes used in Examples 1 and 2 are shown in FIG. 1.

TABLE 1

| Example | R$^1$ | R$^2$ | R$^3$ | R$^4$ | R$^5$ | Max. absorption wavelength (nm) | Molar extinction coefficient |
|---|---|---|---|---|---|---|---|
| 1 | —C$_2$H$_5$ | —C$_2$H$_5$ | 3-CH$_3$ | —CH$_3$ | —COOC$_2$H$_5$ | 549 | 34300 |
| 2 | —C$_2$H$_5$ | —C$_2$H$_5$ | 3-CH$_3$ | phenyl- | —CN | 574 | 59700 |
| 3 | —C$_2$H$_5$ | —C$_2$H$_5$ | —H | —CH$_3$ | —COOC$_2$H$_5$ | 542 | 33600 |
| 4 | —CH$_3$ | —CH$_3$ | 3-CH$_3$ | —CH$_3$ | —COOC$_2$H$_5$ | 546 | 30200 |
| 5 | —C$_2$H$_5$ | —C$_2$H$_5$ | 3-CH$_3$ | —CH$_3$ | —CONHC$_3$H$_7$ (n) | 554 | 34900 |
| 6 | —CH$_3$ | —CH$_3$ | 3-CH$_3$ | —CH$_3$ | —COOC$_4$H$_9$ (n) | 546 | 29500 |
| 7 | —C$_2$H$_5$ | —C$_2$H$_4$OH | 3-CH$_3$ | —CH$_3$ | —COOC$_2$H$_5$ | 551 | 30400 |
| 8 | —C$_2$H$_5$ | —C$_2$H$_5$ | 3-CH$_3$ | —CH$_3$ | —COOC$_4$H$_9$ (n) | 550 | 34700 |
| 9 | —C$_2$H$_5$ | —C$_2$H$_5$ | 3-CH$_3$ | —CH$_3$ | —COOCH$_3$ | 549 | 36800 |
| 10 | —C$_2$H$_5$ | —C$_2$H$_5$ | 3-CH$_3$ | o-toluyl- | —CN | 573 | 60100 |
| 11 | —C$_2$H$_5$ | —C$_2$H$_5$ | 3-CH$_3$ | —C$_4$H$_9$ (t) | —COOC$_2$H$_5$ | 550 | 30000 |
| 12 | —C$_2$H$_5$ | —C$_2$H$_5$ | 3-CH$_3$ | —CH$_3$ | piperidinyl-carbonyl- | 532 | 32900 |
| 13 | —C$_2$H$_5$ | —C$_2$H$_5$ | 3-OC$_2$H$_5$ | —CH$_3$ | —COOC$_2$H$_5$ | 545 | 26400 |
| 14 | —C$_2$H$_5$ | —C$_2$H$_5$ | 3-OCH$_3$ 6-OCH$_3$ | —CH$_3$ | —COOC$_2$H$_5$ | 553 | 28700 |
| 15 | —C$_2$H$_5$ | —C$_2$H$_5$ | 3-CH$_3$ | —CH$_3$ | —CN | | |
| 16 | —C$_2$H$_5$ | —C$_2$H$_5$ | —H | —CH$_3$ | —CN | | |
| 17 | —C$_2$H$_5$ | —C$_2$H$_5$ | 3-CH$_3$ | —CH$_3$ | —CON (CH$_3$)$_2$ | | |

TABLE 1-continued

| Example | $R^1$ | $R^2$ | $R^3$ | $R^4$ | $R^5$ | Max. absorption wavelength (nm) | Molar extinction coefficient |
|---|---|---|---|---|---|---|---|
| 18 | —$C_2H_5$ | —$C_2H_5$ | 3-$CH_3$ | m-toluyl- | —CN | | |
| 19 | —$C_2H_5$ | —$C_2H_5$ | —H | —$CH_3$ | —CON$(CH_3)_2$ | | |
| 20 | —$C_2H_5$ | —$C_2H_5$ | —H | —$CH_3$ | —CON$(CH_3)_2$ | | |
| 21 | —$CH_3$ | —$CH_3$ | 3-$CH_3$ | —$CH_3$ | —COOCH$_3$ | | |

Then, a synthetic paper (Yupo FPG #150, manufactured by Oji-Yuka Synthetic Paper Co., Ltd.) was provided as a substrate sheet, and a coating liquid having the following composition was coated on one surface of the substrate sheet at a coverage of 10.0 g/m² on a dry basis, and the coating was dried at a temperature of 100° C. for 30 min, thereby preparing a thermal transfer image-receiving sheet.

| | |
|---|---|
| Polyester resin (Vylon 200, manufactured by Toyobo Co., Ltd.) | 11.5 parts |
| Vinyl chloride/vinyl acetate copolymer (VYHH, manufactured by UCC) | 5.0 parts |
| Amino-modified silicone (KF-393, manufactured by Shin-Etsu Chemical Co., Ltd.) | 1.2 parts |
| Epoxy-modified silicone (X-22-343, manufactured by Shin-Etsu Chemical Co., Ltd.) | 1.2 parts |
| Methyl ethyl ketone | 46 parts |
| Toluene | 46 parts |

COMPARATIVE EXAMPLES 1 to 5

Comparative thermal transfer sheets were prepared in the same manner as in Example 1, except that dyes listed in Table 2 were used instead of the dye used in Example 1.

TABLE 2

| Comparative Example | $R^1$ | $R^2$ | $R^3$ | $R^4$ | $R^5$ | Max. absorption wavelength (nm) | Molar extinction coefficient |
|---|---|---|---|---|---|---|---|
| 1 | —$C_2H_5$ | —$C_2H_5$ | 3-$CH_3$ | —$CH_3$ | —$CH_3$ | 512 | 28400 |
| 2 | —$C_2H_5$ | —$C_2H_5$ | 3-$OCH_3$ 6-$OCH_3$ | —$CH_3$ | —$CH_3$ | 542 | 29400 |
| 3 | —$C_2H_5$ | —$C_2H_5$ | 3-$CH_3$ | 2,4,6-trichloro-phenyl- | —NHCOCH$_3$ | 533 | 49400 |
| 4 | —$CH_3$ | —$CH_3$ | 3-$CH_3$ | phenyl- | —$CH_3$ | 520 | 36200 |
| 5 | —$C_2H_5$ | —$C_2H_5$ | 3-$CH_3$ | phenyl- | —COOC$_2H_5$ | | |

The thermal transfer sheet of the present invention or the comparative thermal transfer sheet and the above thermal transfer image-receiving sheet were put on top of the other so as for the dye layer to face the dye-receptive surface of the thermal transfer image-receiving sheet, and heat was applied to the laminate through the back surface of the thermal transfer sheet by means of a thermal head under conditions of applied voltage 15.1 V and printing time 8 msec to conduct recording. The results are tabulated in Table 3.

Evaluation of color density:
The color density was measured with a densitometer RD-918 manufactured by Mcbeth U.S.A.

Evaluation of light fastness:
The light browning ratio was determined using a xenon fadeometer (C135A, manufactured by Atlas) under conditions of black panel temperature 50° C., 50 kLux and 50 hr.

TABLE 3

| | | Record density | Light fastness (light browning ratio) |
|---|---|---|---|
| Ex. | 1 | 2.55 | 17 |
| | 2 | 2.30 | 14 |
| | 3 | 2.73 | 22 |
| | 4 | 2.71 | 28 |
| | 5 | 2.53 | 35 |
| | 6 | 2.69 | 29 |
| | 7 | 2.06 | 41 |
| | 8 | 2.61 | 29 |
| | 9 | 2.68 | 23 |
| | 10 | 2.01 | 19 |
| | 11 | 2.26 | 23 |
| | 12 | 2.63 | 25 |
| | 13 | 2.18 | 59 |
| | 14 | 2.09 | 58 |
| | 15 | 2.47 | 16 |
| | 16 | 2.51 | 17 |
| | 17 | 2.61 | 28 |
| | 18 | 2.10 | 18 |
| | 19 | 2.63 | 24 |
| | 20 | 2.69 | 32 |

TABLE 3-continued

| | | Record density | Light fastness (light browning ratio) |
|---|---|---|---|
| | 21 | 2.75 | 30 |
| Comp. Ex. | 1 | 2.74 | 72 |
| | 2 | 2.64 | 89 |
| | 3 | 2.29 | 85 |
| | 4 | 2.77 | 85 |
| | 5 | 2.37 | 64 |

As described above, the thermal transfer sheets using the dye represented by the general formula (I) or (II) can provide images having higher density and superior various types of fastness, particularly excellent light fastness, as compared with the thermal transfer sheets using other conventional pyrazolone-azomethine dyes. Further, the dyes represented by the formulae (I) and (II) have a broad absorption spectrum and, hence, can be mixed with other dyes to provide a thermal transfer sheet for black.

What is claimed is:

1. A thermal transfer sheet comprising:
    a substrate sheet; and
    a dye layer provided on one surface of the substrate sheet, the dye layer being formed of a dye and a binder, the dye contained in the dye layer being at least one member selected from dyes represented by the following general formulae (I) and (II):

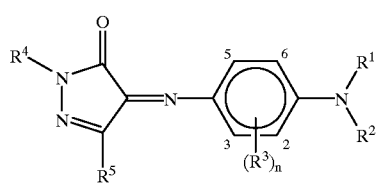

(I)

wherein $R^1$ and $R^2$ each independently represent a substituted or unsubstituted alkyl, cycloalkyl, aralkyl, or aryl group; $R^3$ represents a hydrogen atom, a halogen, a cyano group, a hydroxyl group, a substituted or unsubstituted alkyl, alkoxy, cycloalkyl, aralkyl, aryl, acyl, acylamino, or alkylsulfonylamino group; $R^4$ represents a substituted or unsubstituted alkyl group; $R^5$ represents a substituted or unsubstituted alkoxycarbonyl group; and n is an integer of 1 or 2; and

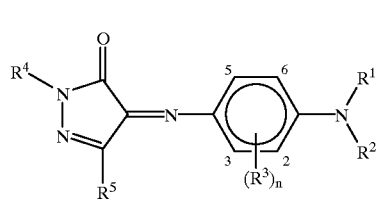

(II)

wherein $R^1$, $R^2$, $R^3$, and n are as defined above in connection with the formula (I), $R^4$ represents a substituted or unsubstituted alkyl or aryl group, and $R^5$ represents a cyano group.

2. The thermal transfer sheet according to claim 1, wherein $R^1$ and $R^2$ in the formulae (I) and (II) each independently represent a substituted or unsubstituted $C_1$–$C_8$ alkyl group, a substituted or unsubstituted $C_3$–$C_8$ cycloalkyl group, a substituted or unsubstituted $C_6$–$C_{13}$ aralkyl, or a substituted or unsubstituted $C_5$–$C_{13}$ aryl group;

the hydrocarbon residue represented by $R^3$ is a substituted or unsubstituted $C_1$–$C_8$ alkyl, a substituted or unsubstituted $C_1$–$C_8$ alkoxy, a substituted or unsubstituted $C_3$–$C_8$ cycloalkyl, a substituted or unsubstituted $C_6$–$C_{13}$ aralkyl, a substituted or unsubstituted $C_5$–$C_{13}$ aryl, a substituted or unsubstituted $C_1$–$C_8$ acyl, a substituted or unsubstituted $C_1$–$C_8$ acylamino, or a substituted or unsubstituted $C_1$–$C_8$ alkylsulfonylamino;

the hydrocarbon residue represented by $R^4$ is a substituted or unsubstituted $C_1$–$C_8$ alkyl group; and the hydrocarbon residue represented by $R^5$ is a substituted or unsubstituted $C_1$–$C_8$ alkoxycarbonyl group.

3. The thermal transfer sheet according to claim 2, wherein $R^1$ and $R^2$ in the formulae (I) and (II) each independently represent a substituted or unsubstituted $C_1$–$C_4$ alkyl group, a substituted or unsubstituted $C_5$–$C_7$ cycloalkyl group, a substituted or unsubstituted $C_6$–$C_{11}$ aralkyl, or a substituted or unsubstituted $C_5$–$C_{10}$ aryl group;

the hydrocarbon residue represented by $R^3$ is a substituted or unsubstituted $C_1$–$C_4$ alkyl, a substituted or unsubstituted $C_1$–$C_4$ alkoxy, a substituted or unsubstituted $C_5$–$C_7$ cycloalkyl, a substituted or unsubstituted $C_6$–$C_{11}$ aralkyl, a substituted or unsubstituted $C_5$–$C_{10}$ aryl, a substituted or unsubstituted $C_1$–$C_4$ acyl, a substituted or unsubstituted $C_1$–$C_4$ acylamino, or a substituted or unsubstituted $C_1$–$C_4$ alkylsulfanylamino;

the hydrocarbon residue represented by $R^4$ is a substituted or unsubstituted $C_1$–$C_6$ alkyl group; and the hydrocarbon residue represented by $R^5$ is a substituted or unsubstituted $C_1$–$C_6$ alkoxycarbonyl group.

* * * * *